Sept. 22, 1931.　　　　　H. L. UBER　　　　　1,824,642
PIPE UNION
Filed Jan. 16, 1931
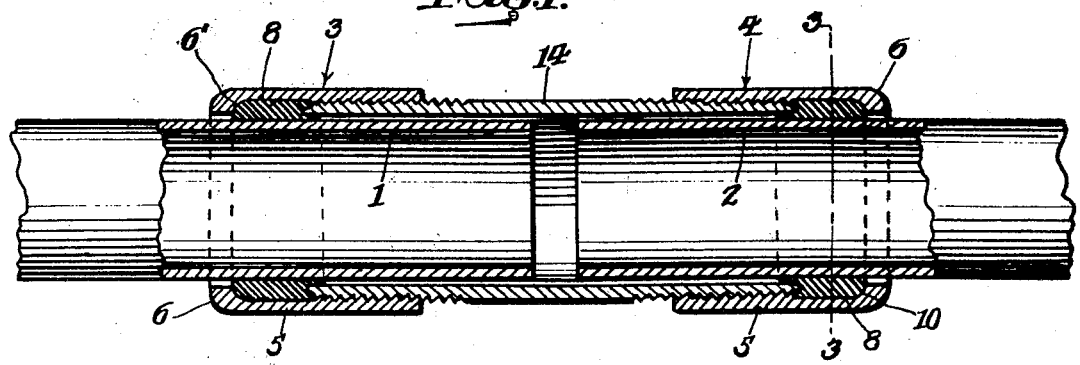
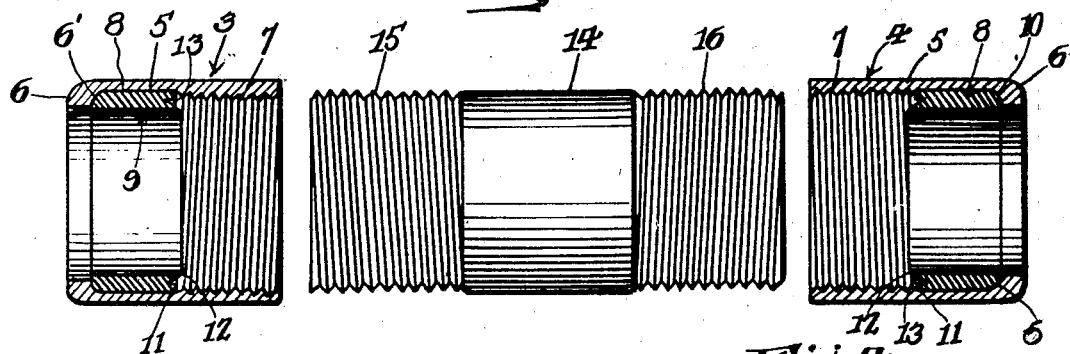
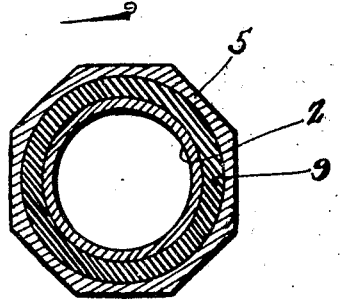
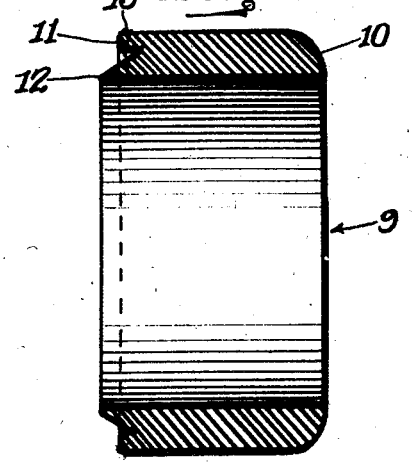
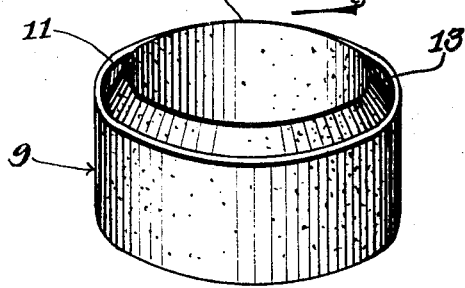
INVENTOR.
Harold L. Uber
BY
Geo. P. Kimmel
ATTORNEY.

Patented Sept. 22, 1931

1,824,642

UNITED STATES PATENT OFFICE

HAROLD LEE UBER, OF JAMESTOWN, NEW YORK, ASSIGNOR OF ONE-THIRD TO C. R. WOMER, OF ELDRED, PENNSYLVANIA, AND ONE-THIRD TO O. D. UNDERWOOD, OF OLEAN, NEW YORK

PIPE UNION

Application filed January 16, 1931. Serial No. 509,248.

This invention relates to a pipe union designed primarily for use in connection with water, gas, oil or air lines or in any connection for which the union may be found applicable, and the invetnion has for its object to provide, in a manner as hereinafter set forth, an adjustable, frictional clamping and non-leakage union between a pair of pipe sections or line sections whereby such sections are securely coupled together in a manner to prevent leakage and the separation thereof.

A further object of the invention is to provide, in a manner as hereinafter set forth, a union for the purpose referred to having elements thereof so constructed as to enable the coupling together of a pair of pipe sections or line sections without the necessity of exteriorly or interiorly threading such sections resulting not only in reducing the cost relative to material, but also as to labor and further greatly facilitating the installation of the union to securely couple together the pipe or line sections to prevent leakage or the separation of such sections relatively to each other.

A further object of the invention is to provide, in a manner as hereinafter set forth, a pipe union including a compressing element and a pair of oppositely disposed, expandible, frictional clamping, gripping and sealing elements each provided with a sealing extension for inter-position between a compressing element and a pipe line section for sealing the ends of the compressing element when the pipe line sections are in coupled position relative to the compressing element.

A further object of the invention is to provide, in a manner as hereinafter set forth, a pipe union for the purpose referred to including a pair of oppositely disposed, expandible, frictional clamping, gripping and sealing elements and a compressing element common to the said other elements, and with each of the expandible, frictional clamping, gripping and sealing elements provided with a groove for the reception of an end of the compressing element and further provided with a sealing extension for inter-position between an end of the compressing element and a pipe line section for sealing the ends of the compressing element when the pipe line sections are coupled relatively to each other.

Further objects of the invention are to provide, in a manner as hereinafter set forth, a pipe union for the purpose referred to which is simple in its construction and arrangement, strong, durable, compact, thoroughly efficient in its use, expeditiously installed, readily assembled and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and mod'fications can be resorted to which fall within the scope of the claims hereunto appended.

In the drawings wherein like reference characters denote corresponding parts throughout the several views:—

Figure 1 is a view partly in longitudinal section and partly in elevation of a pipe union in accordance with this invention and showing the adaptation thereof with respect to a pair of pipe line sections in coupled position.

Figure 2 is a disassembled view of the union partly in longitudinal section and partly in elevation.

Figure 3 is a section on the line 3—3 Figure 1.

Figure 4 is a longitudinal sectional view illustrating the form of expandible, frictional clamping, gripping and sealing elements employed as part of the union.

Figure 5 is a perspective view of the expandible, frictional clamping, gripping and sealing elements.

The union can be of the right threaded type or the right and left threaded type, but is shown by way of example as of the right and left threaded type.

Figure 1 of the drawing illustrates a pair of pipe or line sections indicated at 1, 2 and each has its outer and inner periphery plane throughout, that is to say the said sections are not provided with inner and outer threads at the opposed ends thereof.

The pipe union includes a pair of oppositely disposed flanged carriers generally indicated at 3 and 4. The carriers are of like construction, but one of which will be described, as the description of one will apply to the other. Each carrier comprises an annular body portion 5 in the form of a sleeve of the desired length and inner diameter. The outer periphery of the body portion 5 can be circular or of polygonal contour, and is shown by way of example as polygonal. The inner periphery is of circular contour.

As shown, the outer end of the body portion 5 is formed with an inwardly extending annular flange 6 having its inner diameter greater than the outer diameter of a pipe or line section. The inner face of each flange 6 is rounded as at 6' and provides a seat for a purpose to be presently referred to. The body portion 5 is formed on its inner face with threads 7 which extend from a point removed from the inner face 6' of the flange 6 to the inner end of the body portion 5. That portion of the inner face of the body portion 5 between the inner face of the flange 6 and the body of threads 7 is plane throughout and is indicated at 8.

The union not only includes the pair of oppositely disposed carriers 3, 4 but also includes a pair of oppositely disposed expandible, compressible, frictional clamping, gripping and sealing elements referred to generally at 9 and each of which is mounted in a carrier between the inner face 6' of the flange 6 and the threads 7, that is to say the element 9 is positioned against the portion 8 of the inner face of the body portion 5 and abuts the shoulder 6 and extends to the threads 7. The element 9 is in the form of an annulus having the outer and inner diameters thereof respectively such as to snugly engage the portion 8 of the inner face of the body portion 5 and to be slightly spaced from the outer periphery of a pipe or line section. The inner diameter of element 9 is such as to enable the convenient shifting of a pipe or line section therethrough when setting up the union.

The element 9 has a rounded outer end 10, and the inner end of such element consists of a rounded outer part 11, an annular extended inner part 12 of triangular cross section spaced from the outer part 11 to form in connection with the latter a groove 13 at the inner end of element 9. The extension 12 projects beyond the inner part 11. In cross section the inner and outer faces of the part 11 are squared. In cross section the inner and outer faces respectively of the extension 12 are inclined and squared. The inclined face of the extension 12 opposes the squared inner face of the part 11 and projects beyond said squared inner face. The extension 12 provides a seal for a purpose to be presently referred to.

Common to the carriers 3, 4 and elements 9 is a revoluble, tubular combined coupling and compressing member 14 having its outer diameter substantially the same as the inner diameter of each carrier and its inner diameter greater than the inner diameter of either of the elements 9 and either of the flanges 6 at the edge of the latter. The inner diameter of the member 14 is greater than the outer diameter of each of the pipe line sections 1 or 2. The outer periphery of the member 14 is threaded at each end as at 15, 16. The threads 15 are right and the threads 16 are left. The threads 7 on the inner face of the carrier 3 are right and associate with the threads 15 on the member 14. The threads 7 on the inner face of the carrier 5 are left and associate with the threads 16 on the member 14. The member 14 functions to couple the carriers 3 and 4 together and to compress and expand the elements 9 to clamp and frictionally grip the pipe or line sections whereby such sections are securely coupled together in a manner to prevent leakage and the separation thereof. The threads 15, 16 coact with the threads on the inner faces of the carriers whereby when said member 14 is revolved the carriers are moved towards each other and are also coupled together. The ends of the member 14 seat in the grooves 13 and with the outer parts 11 at the inner ends of the elements 9 positioned on the outer periphery of the member 14 and with the inner part or extensions 12 at the inner ends of elements 9 engaging the inner periphery of the member 14 at the ends thereof and extended between and binding against the inner face of member 14 and outer faces of the pipe line sections. The inner parts 12 of elements 9 when interposed between the pipe line sections and member 14 project beyond the free ends of the outer parts 11 and act as a closure and seal for the ends of the space formed between said pipe line sections and member 14. When the elements 9 are compressed they frictionally clamp and grip the pipe line sections with the carriers and further act as a seal. When the member 14 is revolved in one direction the carriers 3, 4 are moved together whereby the member 14 coacts with the flanges 6 to set up an expanding action on the elements 9 whereby the latter will tightly grip and clamp the pipe line sections 1, 2. When the elements 9 are expanded they project a substantial distance from the flanges 6 with the direction being inwardly with respect to the free edges of the flanges and bind against the pipe line sections 1, 2.

When the union is made between the pipe line sections 1, 2, the pair of carriers with the elements 9 therein are coupled together by the member 14. A pipe line section is then inserted through one of the carriers and elements 9 and a pipe line section inserted through the other carrier and element 9. The pipe line sections are then arranged in opposed, spaced endwise relation. The carriers are arranged a substantial distance from the opposed ends of the pipe line sections. On revolving member 14 the carriers are drawn towards each other and the elements 9 compressed and expanded by member 14 in connection with the flanges 6, whereby the pipe line sections are clamped, gripped and coupled together by the elements 9 and the extensions on the latter acting as a seal to prevent leakage at the ends of the compression member.

As the member 10 is provided with right and left threads it provides on the revolving thereof for simultaneously shifting of the carriers towards and away from each other.

It is thought that the many advantages of a pipe union in accordance with this invention for the purpose set forth can be readily understood, and although the preferred embodiment of the invention is as illustrated and described, yet it is to be understood that changes in the details of construction can be had which fall within the scope of the invention as claimed.

What I claim is:—

1. An expandible, frictional clamping, gripping and sealing element for use in a pipe union of that type including a pair of spaced opposed adjustable carriers and a combined carrier coupling and sealing element compressing member for encompassing throughout in spaced relation opposed terminal portions of a pair of pipe line sections to be coupled, comprising an expandible body portion for mounting in a carrier to encompass the terminal portion of one of said sections, having its inner end formed of an outer part of rectangular cross section and an inner part of triangular cross section for extension into the space between said member and a pipe section to close and seal one end of said space, spaced from and projecting beyond the free end of said outer part and forming in connection with the latter a groove for the reception of a compressing member.

2. In a pipe union, a pair of interiorly threaded, oppositely disposed carriers for mounting on a pair of pipe line sections having inwardly extending flanges at their outer ends, an expandible combined clamping, gripping and sealing element for a pipe section within each carrier and abutting the flange of the latter, each of said elements having its inner end formed of spaced inner and outer parts providing such end with a groove, said inner part projecting beyond said outer part, and a combined coupling and compressing member encompassing and of greater inner diameter than the outer diameter of said sections to form a space therebetween and common to said carriers and elements for coupling the carriers together and expanding said elements to clamp the pipe sections together relative to the carriers and to provide a non-leakage union, said member having its ends extending into said grooves and overlapped by said inner and outer parts, the said inner parts being elongated for extension between said member and sections to a point beyond the free ends of the outer parts for closing and sealing the ends of said space.

In testimony whereof, I affix my signature hereto.

HAROLD LEE UBER.